United States Patent [19]

Sasaki et al.

[11] Patent Number: 5,101,147
[45] Date of Patent: Mar. 31, 1992

[54] METHOD OF CONTROLLING MACHINING SPEED ON INVOLUTE INTERPOLATION

[75] Inventors: Takao Sasaki, Hachioji; Kunihiko Murakami, Hino; Masafumi Sano, Minamitsuru, all of Japan

[73] Assignee: Fanuc Ltd., Minamitsuru, Japan

[21] Appl. No.: 582,852

[22] PCT Filed: Feb. 26, 1990

[86] PCT No.: PCT/JP90/00233
§ 371 Date: Oct. 17, 1990
§ 102(e) Date: Oct. 17, 1990

[87] PCT Pub. No.: WO90/10900
PCT Pub. Date: Sep. 20, 1990

[30] Foreign Application Priority Data

Mar. 13, 1989 [JP] Japan .................................. 1-60470

[51] Int. Cl.$^5$ .............................................. G05B 19/25
[52] U.S. Cl. .............................. 318/573; 318/568.15; 318/574; 318/570
[58] Field of Search ............... 318/573, 568.15, 574, 318/570

[56] References Cited

U.S. PATENT DOCUMENTS

| | | | |
|---|---|---|---|
| 4,899,096 | 2/1990 | Kawamura et al. | 318/573 |
| 4,926,102 | 5/1990 | Kawamura et al. | 318/573 |
| 4,935,681 | 6/1990 | Kawamura et al. | 318/569 |
| 4,959,597 | 9/1990 | Kawamura et al. | 318/568.15 |

Primary Examiner—William M. Shoop, Jr.
Assistant Examiner—Saul M. Bergmann
Attorney, Agent, or Firm—Staas & Halsey

[57] ABSTRACT

An involute interpolation speed control method controls a machining speed during a numerical control machining process with involute curve interpolation. A radius of curvature is determined from equations of the involute curve (S3), and whether said radius of curvature is smaller than a predetermined value is then determined (S4). The machining speed is reduced with an override value if the radius of curvature is smaller than the predetermined value (S5, S6, S7). In the vicinity of a base circle for the involute curve, since the radius of curvature is small, any well machined surface would not be produced at a given tangential speed. Therefore, the machining speed is reduced with the override value in the vicinity of the base circle.

3 Claims, 4 Drawing Sheets

METHOD OF CONTROLLING MACHINING SPEED ON INVOLUTE INTERPOLATION

TECHNICAL FIELD

The present invention relates to a method of controlling a machining speed during an involute curve interpolation process, and more particularly to an involute interpolation speed control method which reduces a machining speed in the vicinity of a base circle for an involute curve.

BACKGROUND ART

Nonlinear interpolation, particularly involute interpolation, in numerical control systems is highly required for the machining of gears, pump vanes, or the like. Generally, an involute curve is interpolated by a computer or an NC program generator which is separate from a numerical control system, producing linear data on a tape, and a workpiece is machined by the numerical control system using the tape.

The applicants have filed Japanese Patent Application No. 62-157302 (Japanese Laid-Open Patent Publication No. 64-2106) on an involute interpolation speed control method. According to the disclosed method, an involute curve is simply interpolated in a numerical control system, and the speed in a tangential direction is held constant irrespective of the angle.

In the proposed involute interpolation speed method, the coordinates of a point on an involute curve are given by:

$$X = R\{\cos(\theta + \theta 1) + \theta\sin(\theta + \theta 1)\} + Xo$$

$$Y = R\{\sin(\theta + \theta 1) - \theta\cos(\theta + \theta 1)\} + Yo,$$

the angle $\theta$ is increased in a range from $\theta = (\theta 2 - \theta 1)$ to $\theta = (\theta 3 - \theta 1)$ by an increment:

$$\theta n + 1 = \theta n + K/(R \cdot \theta),$$

a point $Xn+1$, $Yn+1$ corresponding to the increased angle is determined according to the above equations, and the difference between the points is determined, thus interpolating the involute curve.

The speed in a tangential direction can be rendered constant by selecting the increment of $\theta$ to be of a value which is reduced in inverse proportion to the angle, i.e., a value of $K/(R \cdot \theta)$.

In the vicinity of the base circle for the involute curve, i.e., a region where the radius of curvature of the involute curve is relatively small, however, a cutter would be subjected to a large load, making the machined surface defective if the workpiece were machined at a feed speed commanded by the program.

DISCLOSURE OF THE INVENTION

The present invention has been made in view of the aforesaid drawbacks. It is an object of the present invention to provide an involute interpolation speed control method which reduces a machining speed in a region near a base circle, where the radius of curvature of an involute curve is relatively small, thereby producing a well machined surface.

To achieve the above object, there is provided in accordance with the present invention a method of controlling a machining speed during a numerical control machining process with involute curve interpolation, comprising the steps of determining a radius of curvature from equations of the involute curve, determining whether said radius of curvature is smaller than a predetermined value, and reducing the machining speed with an override value if the radius of curvature is smaller than the predetermined value.

In the vicinity of a base circle for the involute curve, since the radius of curvature is small, any well machined surface would not be produced at a given tangential speed. Therefore, the machining speed is reduced with the override value in the vicinity of the base circle.

BEST MODE FOR CARRYING OUT THE INVENTION

An embodiment of the present invention will hereinafter be described with reference to the drawings.

Figure 2:
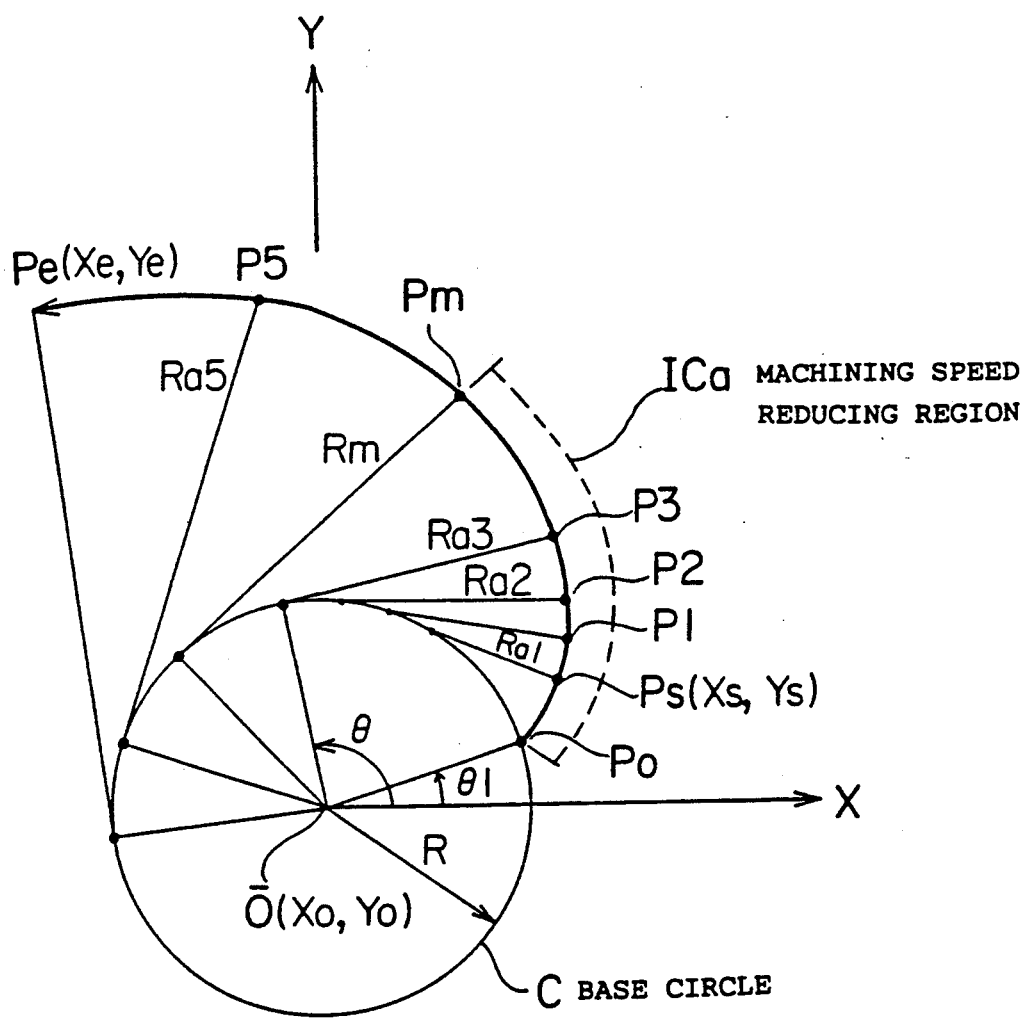
FIG. 2 is a diagram showing an involute curve interpolated according to the present invention.

FIG. 2 is a diagram showing an involute curve interpolated according to the present invention. The diagram illustrates an instance in which the involute curve is drawn by the end of a thread as it is unwound counterclockwise away a base circle C. The command for the involute curve is given by G03.1. Another involute curve includes a curve drawn by the end of a thread as it is wound clockwise onto the base circle C. However, these involute curves are basically the same. The base circle C is a circle which serves as a base for drawing involute curves. The base circle C has a center O given by coordinates $(X_O, Y_O)$ and a radius R. The involute curve, denoted at IC, starts at a point Po.

The command for involute interpolation is given by:
G17G03.2X—Y—I
J—R—F—;

The code G17 is a command indicating a plane. The code G77 indicates an X-Y plane, a code G18 a Z-X plane, and a code G19 a Y-Z plane.

The code G03.2 is a command for counterclockwise involute interpolation. Clockwise involute interpolation is commanded by a code G02.2. Whether the involute curve is drawn by the end of a thread as it moves toward or away from the base circle C depends on the coordinates of a starting point Ps (Xs, Ys) and an ending point Pe (Xe, Ye) of the involute curve IC.

X—Y—represents the coordinates of the ending point of the involute curve IC. In FIG. 2, these coordinates are indicated by Pe (Xe, Ye), and are commanded by absolute values.

I—J—represents the coordinates of the center 0 of the base circle C as it is viewed from the starting point Ps (Xs, Ys), and is commanded by incremental values.

R—represents the radius R of the base circle C, and F—represents the feed speed.

The equations of the involute curve are expressed below according to the indicated values given above. The interpolation is carried out according to these equations.

$$X = R\{\cos\theta + (\theta - \theta 1)\sin\theta\} + Xo \ldots \quad (1)$$

$$Y = R\{\sin\theta - (\theta - \theta 1)\cos\theta\} + Yo \ldots \quad (2)$$

As seen from FIG. 2, radii of curvature Ra1, Ra2, Ra3 at respective points P1, P2, P3 on the involute curve IC are small. If the workpiece were machined at these points at a commanded speed F, the load on the cutter would be excessive, and no well machined surface would be produced. According to the present invention, therefore, in a region where the radius of curvature is smaller than a certain value Rm, i.e., on the righthand side of a point Pm on the involute curve IC or in a machining speed reduction region ICa, the machining speed is reduced and the workpiece is machined at the reduced machining speed. In a region, such as a point P5, which is to the left of the point Pm on the curve Pe, the workpiece is machined at the commanded feed speed F.

The above speed control is effected by determining a radius of curvature upon involute interpolation, comparing the determined radius of curvature with a predetermined value Rm, and reducing the machining speed when the radius of curvature Ra is smaller than the value Rm.

Figure 1:
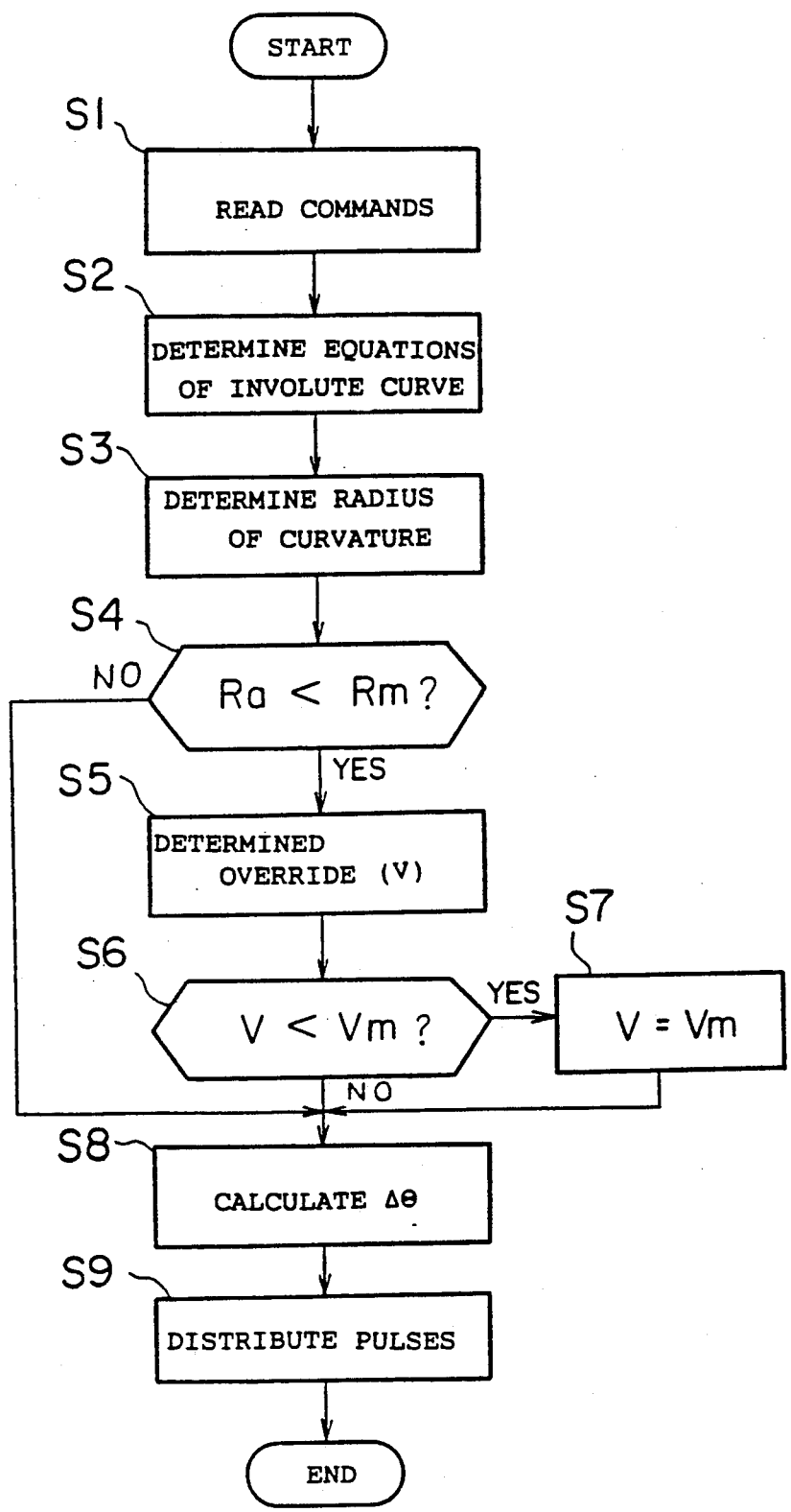
FIG. 1 is a flowchart of a processing sequence of an involute interpolation speed control method according to the present invention.

FIG. 1 is a flowchart of a processing sequence of an involute interpolation speed control method according to the present invention. The numerical values following the letter "S" in FIG. 1 represent step numbers.

[S1] Various commands are read which specify an involute curve, including the direction in which to rotate the curve, a feed speed, the position of the center of a base circle, the radius of the base circle, and the point of the ending point of the curve. The present position is set in a memory in the control system.

[S2] The equations of the involute curve which interconnects the starting and ending points are determined from the given commands.

[S3] The radius of curvature R at the present position on the involute curve (the present position is a starting point when starting involute interpolation) is determined. The radius of curvature Ra per distributed pulse is given by the following equation:

$$Ra = R \cdot (\theta - \theta 1).$$

As described above, the coordinates of a point on the involute curve are expressed as follows:

$$X = R\{\cos\theta + (\theta - \theta 1)\sin\theta\} + Xo$$

$$Y = R\{\sin\theta - (\theta - \theta 1)\cos\theta\} + Yo$$

where X, Y represent the present position, Xo, Yo the position of the center of the base circle, R the radius of the base circle C, $\theta$ the angle between the X-axis and a line which interconnects the point O (Xo, Yo) and a point where a tangential line passing perpendicularly through a point P (X, Y) on the involute curve IC contacts the base circle C, and $\theta 1$ the angle where the involute curve IC starts.

[S4] The radius of curvature Ra of the involute curve IC is compared with a reference value Rm. If Ra<Rm, control goes to a step S5, and if not, V is selected to be V = 1, and control goes to a step S8.

[S5] An override value (V) for reducing the machining speed is determined according to the following equation:

$$V = Ra/Rm.$$

[S6] The step S6 determines whether the override value V is lower than a lower limit value Vn or not. If yes, control goes to a step S7, and if not, control goes to the step S8.

[S7] Since the override value is lower than the lower limit value Vn, the override value is clamped to the lower limit value Vn.

[S8] An increment $\Delta\theta$ of the angle $\theta$ per distributed pulse is calculated according to the following equation:

$$\Delta\theta = V \cdot K / \{R \cdot (\theta - \theta 1)\}$$

where $K = \tau \cdot (F/60)$, $\tau$ represents the period at which pulses are distributed [sec.], and F the feed speed [mm/min.].

[S9] The distribution of pulses is calculated.

The above cycle is repeated until the ending point Pe (Xe, Ye) of the involute curve is reached.

Figure 3:
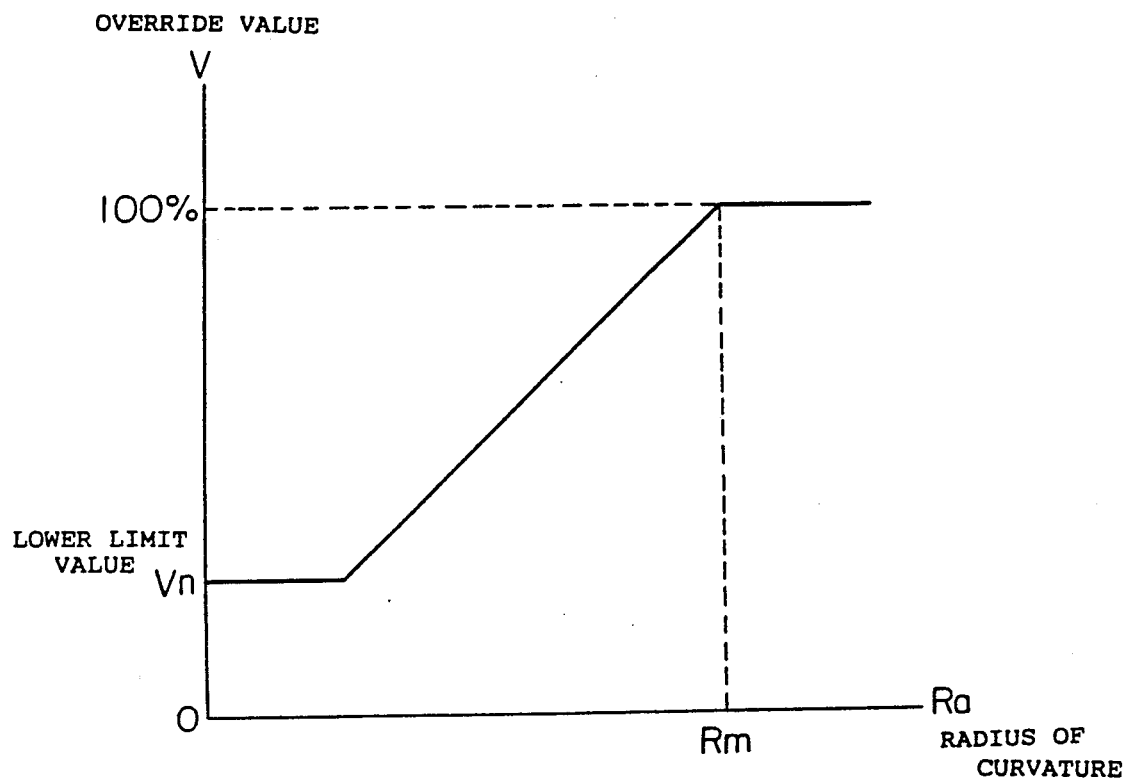
FIG. 3 is a diagram showing the correspondence between radii of curvature and override values.

FIG. 3 shows how the radii of curvature correspond to the override values. FIG. 3 represents the steps S4 through S7 in FIG. 2 for determining an override value. The horizontal axis of FIG. 3 indicates the radius of curvature Ra and the vertical axis the override values. When the radius of curvature is larger than the value Rm, then the override value is 100%. When the radius of curvature Ra becomes smaller than the value Rm, the override value linearly decreases. When the override value V reaches the lower limit value Vn, the override value is clamped to the lower limit value Vn.

The value Rm and the lower limit value Vn are preset depending on the material of a workpiece to be machined, the cutter to be used to machine the workpiece, and the size of the base circle for the involute curve.

Therefore, in the vicinity of the base circle, i.e., when the radius of curvature is smaller than a certain value, the machining speed is lowered.

Figure 4:
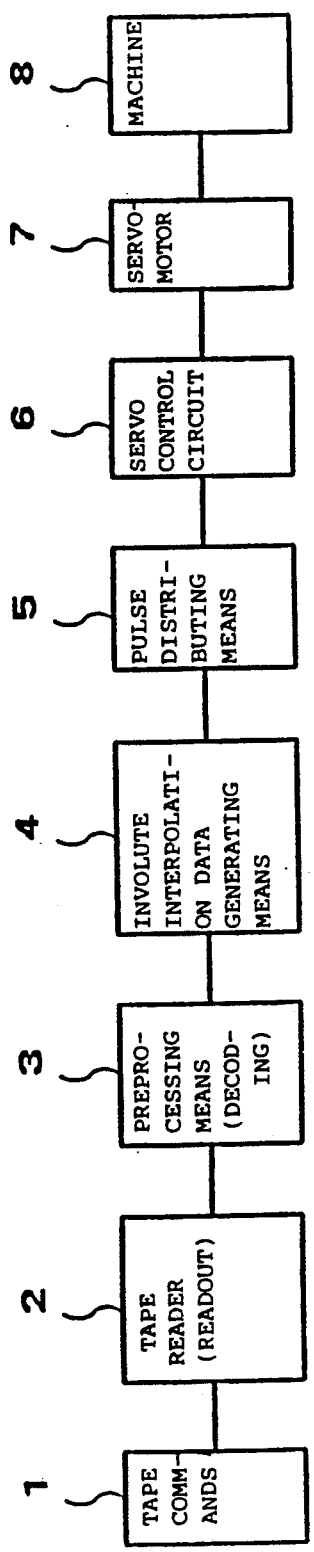
FIG. 4 is a schematic block diagram of a numerical control system in the embodiment of the present invention.

FIG. 4 schematically shows the numerical control system in the embodiment of the present invention. Tape commands 1 are given by a tape with punched commands. The tape commands 1 are read by a tape reader 2. A preprocessing means 3 determines, from the G code, whether there is an involute interpolation command or not. An involute interpolation data generating means 4 generates data necessary for involute interpolation from the command values. At the same time, the involute interpolation data generating means 4 calculates a radius of curvature, and if the calculated radius of curvature is smaller than a certain value, determines an override value, according to which the speed is reduced. A pulse distributing means 5 increases the angle $\theta$ to determine points on the involute curve based on the data generated by the involute interpolation data generating means 4 according to the above equations, effects the interpolation, and distributes pulses. A servo control circuit 6 energizes a servomotor 7 according to the command. The servomotor 7 causes a ball screw or the like to move a machine 8.

With the present invention, as described above, since the machining speed is reduced in a region near the base circle where the radius of curvature of an involute curve is small, the load on the cutter is reduced, and a well machined surface can be produced.

We claim:

1. A method of controlling a machining speed during a numerical control machining process with involute curve interpolation, comprising the steps of:
   (a) determining a radius of curvature from equations governing the function that describes an involute curve;
   (b) determining whether said radius of curvature is smaller than a predetermined value; and
   (c) reducing the machining speed with an override value if the radius of curvature is smaller than the predetermined value.

2. A method according to claim 1, wherein the equations in said step (a) are given by:

$$X = R\{\cos\theta + (\theta - \theta_1)\sin\theta\} + X_o$$

$$Y = R\{\sin\theta - (\theta - \theta_1)\cos\theta\} + Y_o$$

where X, Y represent a position on said involute curve, $\theta$ is the angle between an X-axis and a line which interconnects the center of a base circle for the involute curve and a point where a tangential line passing perpendicularly through the point on the involute curve contacts said base circle, $\theta_1$ is the angle between the X-axis and a line interconnecting a starting point of said involute curve and the center of said base circle, $X_o$ and $Y_o$ are the coordinates of the center of said base circle, and R is the radius of said base circle, thereby effecting the involute curve interpolation.

3. A method according to claim 1, wherein in said step (c), the override value is linearly reduced when the radius of curvature is smaller than the predetermined value, and is clamped to a predetermined lower limit value.

* * * * *

UNITED STATES PATENT AND TRADEMARK OFFICE
CERTIFICATE OF CORRECTION

PATENT NO. : 5,101,147
DATED : MARCH 31, 1992
INVENTOR(S) : TAKAO SASAKI ET AL.

It is certified that error appears in the above-identified patent and that said Letters Patent is hereby corrected as shown below:

Col. 2, line 47, "G77" should be --G17--.

Signed and Sealed this

Sixth Day of July, 1993

Attest:

MICHAEL K. KIRK

Attesting Officer    Acting Commissioner of Patents and Trademarks